Oct. 20, 1970 YUGORO KOBAYASHI 3,535,685

CONTINUOUS SIGNAL STORAGE DEVICE

Filed Sept. 15, 1969 2 Sheets-Sheet 1

United States Patent Office 3,535,685
Patented Oct. 20, 1970

3,535,685

CONTINUOUS SIGNAL STORAGE DEVICE

Yugoro Kobayashi, Tokyo, Japan, assignor to Kabushiki Kaisha Ricoh, Tokyo, Japan Filed Sept. 15, 1969, Ser. No. 857,795
Claims priority, application Japan, Sept. 19, 1968, 43/67,273
Int. Cl. G11c *25/00;* H01h *41/00, 43/10*
U.S. Cl. 340—173 5 Claims

ABSTRACT OF THE DISCLOSURE

A continuous signal storage device wherein a plurality of armatures are slidably attracted to the outer periphery of a magnetic cam rotating at a predetermined speed relative to a conveyer; said armature are so controlled by a pair of pawls actuated alternately in response to signals representative of the position of the conveyer as to alternately permit and prevent the advancement of one of said armatures together with said cam; and the advanced armature is adapted to actuate means for generating a second signal (corresponding to said first signals). The time of generating second signals may be uniquely related with the position of the conveyer so that the time interval between the first and second signal generations can be adjusted in a simple manner.

BACKGROUND OF THE INVENTION

The present invention relates to an apparatus having a conveyer such as a diazo type copying machine, printing press or the like and more particularly to a continuous signal storage device for the apparatus of the character described above.

In order to carry out automatically various operations associated with the position of the conveyer in the apparatus of the character described above, it is necessary to derive the signal which is generated at a certain position of the conveyer, after the conveyer has advanced over a predetermined distance. That is, the signal or value is stored for a predetermined time and said signal or the value is derived again after said predetermined time. For example, in case of a diazo type copying machine incorporating a collator, a desired number of copies must be provided from each of a plurality of originals and thus provided copies must be stacked upon the shelves of the collator. In this case, the conventional method is generally such that a predetermined number of copies are made for each original; the copies are transferred to the sleeve of the collator; the next original is copied in a predetermined number in the same manner; the copies of the second original are overlaid upon the first copies; and so on. In this method, the shelves of the collator must be brought to the insertion positions in order to receive the copies being copied from one original. That is, the collator must be displaced in response to the signal representative of the above copying operation or of the completion of the predetermined number of copies so that the required shelves of the collator may be brought to the insertion position. However, there is a time lag between the time of detecting the above copying operation or completion of copies and generating the signal representative thereof and the time the copies reach the collator by the conveyer. That is, the collator must be brought to the insertion position after the above time lag or time interval. For this purpose, the conventional device provides separate switches and counters in the detecting position and the collator respectively so that they may be suitably coacted with each other. thereby performing a desired operation. However, it is extremely difficult to adjust the individual switch and counter so that they may be coacted in response to each other with a high degree of accuracy.

The primary object of the present invention is therefore to eliminate such defects as described above and encountered in the conventional device.

Another object of the present invention is to provide a continuous signal storage device for apparatus incorporating a conveyer system wherein the position of the conveyer and the signal generated in response to the above position may be uniquely co-related with each other.

A further object of the present invention is to provide a continuous signal storage device for the apparatus of the character described above wherein the time interval between the conveyer position indicating signal and the second signal may be freely and simply adjusted.

A still further object of the present inventiton is to provide a continuous signal storage device for the apparatus incorporating therein a conveyor system wherein said second signal is representative of a value or an analog quantity.

SUMMARY OF THE INVENTION

In brief, in order to establish a co-relation between the detection of the conveyer position and the generation of a signal for controlling the actuation of a device in response to the above conveyer position, the device of the present invention comprises a disk-shaped rotary magnetic cam, a plurality of armatures slidably attracted to the outer periphery of the magnetic cam, a pair of pawls for permitting and preventing the displacement one of the armatures together with the magnetic cam, a solenoid adapted to be energized in response to the signal from the conveyer for controlling the pair of pawls, and a second signal generating element to be energized by the armatures. Upon energization of the solenoid by the signal from the conveyer, the first pawl of the pair of pawls which has been engaging the armatures release the first one of the armatures whereas the second pawl engages with the second armature. The released armature is advanced together with the magnetic cam and actuates the second signal generating element. The above operation is repeated everytime when one signal is generated from the conveyer. The time interval between the first signal generation at the conveyer and the second signal generation by the second signal generating element may be adjusted suitably by adjusting the distance between the two signal generating elements.

The armatures may be representative of values or analog quantities so that the second signals may be representative of these values or analog quantities. According to one embodiment of the present invention, the setting of these values or analog quantities is made by selecting the position of a pin which is slidably fitted into the armature and the position of the pin is determined in response to the signal generated by an analog quantity setting device. The second signal is determined in response to the position of the pin.

The above and other objects, features and advantages of the present invention will become more apparent from the following description of one illustrative embodiment with reference to the accompanying drawings.

DESCRIPTION OF THE PREFERRED EMBODIMENT

Figure 1:
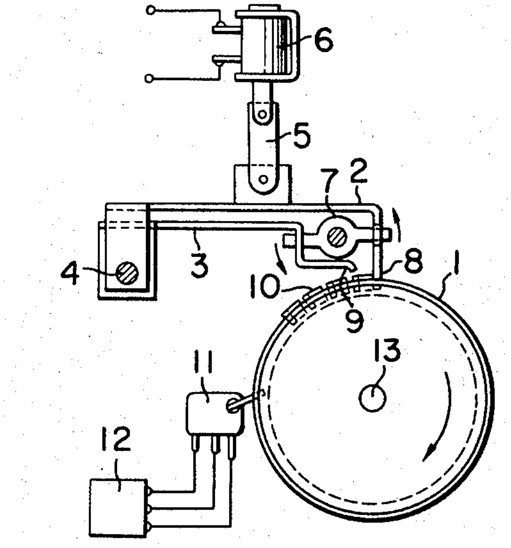
FIG. 1 is a side view of one embodiment of a continuous signal storage device in accordance with the present invention.

Referring to FIG. 1, a magnetic cam 1 is interlocked with a conveyer not shown for rotation in the direction indicated by the arrow at a predetermined rate of rotation. A first and second engaging pawls 2 and 3 are pivotably fixed to a pivot 4 for rotation thereabout independently of each other. The first engaging pawl 2 is controlled by a solenoid 6 through a connecting rod 5 which in turn is pivoted to the engaging pawl 2, the solenoid 6 being actuated by the signals from an original or copy paper detection switch (not shown). A seesaw or rocking lever 7 is so actuated that the engaging ends 8 and 9 of the first and second engaging pawls 2 and 3 alternatively move upwardly and downwardly so as to engage with the magnetic cam 1. A plurality of armatures 10 are disposed around the magnetic cam 1 and are normally stopped stationarily as shown in FIG. 1 since the engaging end 8 of the first engaging pawl 2 engages one of the armatures 10. But upon actuation of the solenoid 6, the engaging pawl 2 disengages its engaging end 8 from the armature so that the armatures rotate through a predetermined angle together with the magnetic cam 1, so that the armature 10 pushed an actuator of a switch 11 after a predetermined time interval, thereby transmitting the signal to a receiver 12.

Figure 2:
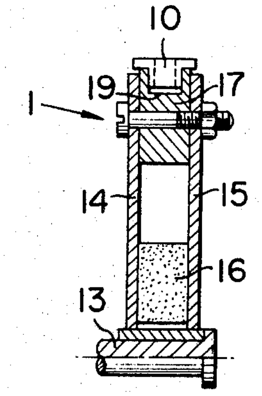
FIG. 2 is a fragmental sectional view of a magnetic cam used in the device of the present invention.

Referring to FIG. 2, a permanent magnet 16 is interposed between a pair of spaced apart disks 14 and 15 made of magnetic material fixedly carried by a shaft 13 and close to the centers of the disks 14 and 15 so that these disks constitute the poles of the permanent magnet 16. A ring 17 is interposed between the pair of disks 14 and 15 close to the outer peripheries thereof and is held in position by means of a bolt 18. The outer diameter of the ring 17 is slightly larger than the diameter of each of the pair of disks 14 and 15 and has a groove 19 extending throughout the circumferential surface thereof. It is preferable to make the ring 17 of a material having a smaller coefficient of friction such as nylon.

Figure 3:
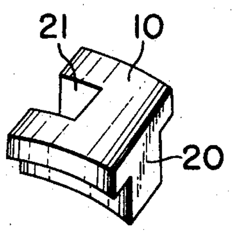
FIG. 3 is a perspective view of an armature.

Referring to FIG. 3, the armature 10 is T-shaped in cross section and the leg portion 20 thereof is adapted to loosely fit into the groove 19 of the ring 17. A notch 21 is formed at the rear end portion of the armature 10 for the purpose to be described in more detail hereinafter. As will be seen from FIG. 2, the armature forms a magnetic path together with the pair of disks 14 and 15 and the permanent magnet 16, and is attracted by the magnetic cam 1.

Next the mode of operation of the continuous signal storage device with the construction described hereinabove will be described.

As described above, the magnetic cam 1 is normally rotating coating with the conveyer (not shown) and one of the armatures 10 engages with the engaging end 8 of the first engaging pawl 2 so that the series of armatures 10 are not allowed to move together with the magnetic cam 1. That is, the series of armatures 10 are held stationary, although they slide over the magnetic cam 1, that is over the ring 17. In this case, the second engaging pawl 3 is disengaged from the armatures 10 by the seesaw or rocking lever 7.

When the passage of an original to be copied or a copy paper is detected by a detecting switch (not shown) disposed at the leading end portion of the conveyor (not shown), the signal is generated and applied to the solenoid 6 thereby to energize it so that the first engaging pawl 2 is raised by the connecting rod 5, thereby disengaging the engaging end 8 thereof from the armature 10. Thus, the armature 10 is rotated together with the rotation of the magnetic cam 1. In this case, the second engaging pawl 3 is moved downwardly by the actuation of the seesaw or rocking lever 7 so that its engaging end 9 engages with the notch 21 of the first armature 10 thereby preventing the movement of the following armatures 10. That is, when the solenoid 6 is energized, only the first armature is carried by the magnetic cam 1. Upon de-energization of the solenoid 6, the first engaging pawl 2 is moved downwardly again whereas the second engaging pawl 3 is moved upwardly so that the armatures 10 are advanced until the second armature 10 engages with the engaging end 8 of the first engaging pawl 2, thereby stopping the armatures 10. In the same manner as described above, upon application of the next detection signal, the second armature 10 is carried away by the magnetic cam 1. Thus, it will be seen that one armature 10 is carried by the magnetic cam 1 for each detection signal. The armature 10 carried by the magnetic cam 1 reaches the switch 11 and actuates the same so that the signal from the switch 11 is transmitted to the receiver 12.

Therefore, for example a collector is advanced by one step. That is, the detection signal generated by the switch upon the conveyer is transformed to the signal generated by the switch 11 after the time interval between the time when the armature 10 is released from the engaging end 8 of the first engaging pawl 2 and the time when the armature 10 reaches and actuates the switch 11, the signal generated from the switch 11 being used for various purposes. In this case, it should be noted that by changing the position of the switch 11, the above time interval may be suitably adjusted.

Figure 4A:
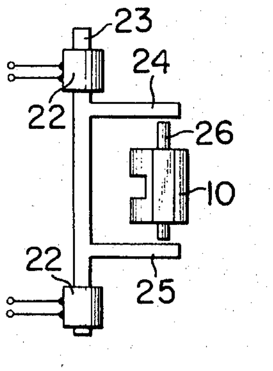
FIG. 4–A to FIG. 5–B are diagrammatic views illustrating the positions of the armatures with respect to analog quantity setting devices of one embodiment of the present invention respectively.
Figure 4B:
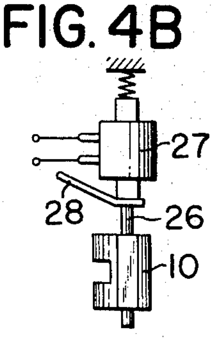
Figure 6:
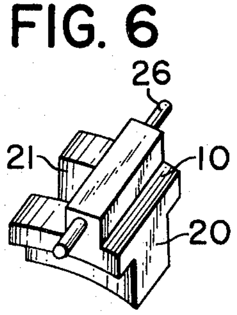
FIG. 6 is a perspective view of the armature used in FIGS. 4 and 5.

For better understanding of the device of the present invention, one application thereof will be described hereinafter. Let it be assumed that it is desired to adjust or control the light quantity for exposure or exposure speed in response to the transparency of the original to be copied, measured at a suitable position along the passage thereof. In this case, the armature 10 carried to the switch 11 for actuation thereof by the magnetic cam 1 must be assigned with a suitable value or analog quantity so that the signal generated by the switch 11 may be representative of this value or analog quantity. This will be illustrated in FIG. 4–A to FIG. 6. Referring to FIG. 4–A, a setting rod 23 is slidably extending through a setting device 22 and between a pair of setting arms 24 and 25 extended from the setting rod 23 is interposed the armature 10 which in turn is slidably fitted over a pin 26 extending between the pair of spaced apart setting arms 24 and 25.

In response to the signal representative of an analog quantity applied to the setting device 22, the setting rod 23 is shifted within the setting device so that the pin 26 is shifed relative to the armature 10. As the armature 10 is carried by the magnetic cam 1 as described above with reference to FIGS. 1 to 3 with the pin 26 being shifted also as described above, the pin 26 pushes upwardly a pickup plate 28 of a detecting device 27 shown in FIG. 4–B by a distance corresponding to the above analog quantity. The detecting device 27 is adapted to generate the current or voltage detection signal corresponding to the distance over which the pickup plate 28 is moved upwardly by the pin 26. Thus generate signal may be used for determining the light quantity for exposure or exposure time or speed as described above.

Figure 5B:
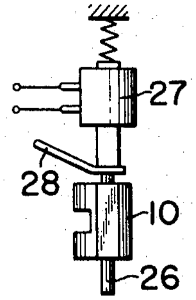
Figure 5A:
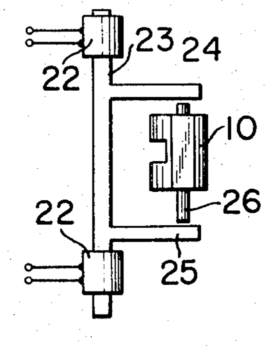

FIGS. 5–A and 5–B illustrates that the analog quantity different from that illustrated in FIGS. 4–A and 4–B is applied to the setting device 22. In this case, the displacement of the pickup plate 28 is shorter than that shown in FIG. 4–A so that the signal different from that generated in case of FIGS. 4–A and 4–B is generated by the detecting device 27.

From the foregoing, it is understood that according to the present invention, the original or copy paper is detected upon the conveyer and the signal representative of the position, the properties or the like thereof is generated. In response this first signal, the second signal is generated for automatically carrying out a desired operation in response to the detected properties or the like of the original or the copy. In this case, the adjustment is limited only to that between the detection switch or the like upon or along the conveyer and the second signal generating means (detecting device 27), opposed to the complicated adjustments among a plurality of signal generating means required in the conventional device.

It is also possible according to the present invention to carry out various desired operations in various positions along the conveyer path by arranging a plurality of magnetic cams, each rotating at a different speed, of the continuous signal storage device of the present invention so that various different signals may be generated in response to a common signal generated by a common detecting switch or the like.

I claim:

1. A continuous signal storage device for an apparatus having a conveyer characterized by a magnetic cam adapted to rotate at a predetermined ratio relative to the rotation of the conveyer, said magnetic cam attracting a predetermined number of armatures upon the outer periphery thereof;

a first engaging pawl adapted to normally prevent the rotation of said armatures so as to hold them in preparatory position and to permit one of said armatures to rotate together with said magnetic cam in response one detection signal transmitted from said conveyer;

a second engaging pawl adapted to prevent the rotation of the armature next to said one of said armatures when said first engaging pawl permits the rotation of the latter; and a signal generating element adapted to be actuated by the armature rotated together with said magnetic cam.

2. A continuous signal storage device as set forth in claim 1 wherein said magnetic cam is comprising a pair of spaced apart side disks made of magnetic material, a permanent magnet interposed between said pair of side disks and at the position close to the centers thereof, and a ring interposed between said pair of side disks and spaced apart from said permanent magnet radially outwardly thereof, said ring having a circumferential groove into which are fitted said armatures.

3. A continuous signal storage device as set forth in claim 1 wherein each of said armatures is so arranged as to set a value or analog quantity and an element actuated by each of said armatures is adapted to generate a signal representative of said value or analog quantity set by said each of said armatures.

4. A continuous signal storage device as set forth in claim 3 wherein said setting by said each of said armatures is made by varying the position of a pin which is slidably fitted into said each of said armatures.

5. A continuous signal storage device as set forth in claim 2 wherein each of said armatures is so arranged as to set a value or analog quantity and an element actuated by each of said armatures is adapted to generate a signal representative of said value or analog quantity set by said each of said armatures.

References Cited

UNITED STATES PATENTS 2,661,091 12/1953 Maloney ........... 340—173

TERRELL W. FEARS, Primary Examiner

U.S. Cl. X.R.

209—218